US011932148B2

(12) United States Patent
Justman et al.

(10) Patent No.: US 11,932,148 B2
(45) Date of Patent: Mar. 19, 2024

(54) BELLOWS FOR SEAT ASSEMBLY

(71) Applicant: Seats Incorporated, Reedsburg, WI (US)

(72) Inventors: Joshua M. Justman, LaValle, WI (US); Jesse C. Boyarski, Richland Center, WI (US); Mitchell E. Zank, Westminster, CO (US)

(73) Assignee: SEATS INCORPORATED, Reedsburg, WI (US)

( * ) Notice: Subject to any disclaimer, the term of this patent is extended or adjusted under 35 U.S.C. 154(b) by 574 days.

(21) Appl. No.: 17/101,747

(22) Filed: Nov. 23, 2020

(65) Prior Publication Data

US 2022/0161702 A1 May 26, 2022

(51) Int. Cl.
*F16J 3/04* (2006.01)
*B60N 2/50* (2006.01)
*B60N 2/60* (2006.01)
*B60N 2/90* (2018.01)

(52) U.S. Cl.
CPC ............... *B60N 2/90* (2018.02); *B60N 2/50* (2013.01); *B60N 2/60* (2013.01); *F16J 3/042* (2013.01)

(58) Field of Classification Search
CPC ........ B60N 2/1615; B60N 2/162; B60N 2/50; B60N 2/60; B60N 2/90; F16J 3/042
USPC .......................... 297/344.15, 344.16, 344.17
See application file for complete search history.

(56) References Cited

U.S. PATENT DOCUMENTS

| 2,025,635 A | | 12/1935 | Bishoff | |
|---|---|---|---|---|
| 4,448,382 A | * | 5/1984 | Melone | A47C 3/30 297/344.17 |
| 4,527,976 A | * | 7/1985 | Behringer | A61G 15/10 297/344.17 |
| 4,533,106 A | * | 8/1985 | Stockl | A61G 15/02 297/344.15 X |
| 4,598,946 A | * | 7/1986 | Cone | A47D 13/107 5/105 |

(Continued)

FOREIGN PATENT DOCUMENTS

DE 102007059509 B3 * 11/2008 ............... B60N 2/50
EP 1849651 B1 7/2010

(Continued)

OTHER PUBLICATIONS

Grammer. Repair Manual Grammer Seats MSG 65/511-522. Jun. 2009. Located online at https://USA.grammer.com/fileadmin/user_upload/Repair_Manual_MSG65.pdf. Especially pp. 53-57.

(Continued)

*Primary Examiner* — Rodney B White
(74) *Attorney, Agent, or Firm* — Quarles & Brady LLP

(57) ABSTRACT

A bellows for a seat assembly for a cab of a vehicle can include a skirt configured to substantially surround a perimeter of a base of the seat assembly. The skirt can have a continuous perimeter extending between first and second free ends of the skirt along four sides of the base of the seat assembly. The bellows can include a break between the first and second free ends of the skirt to provide access to the base portion via the break, or to install or remove the skirt from the base portion without detaching the base portion from the cab or detaching the seating portion from the seat assembly.

22 Claims, 10 Drawing Sheets

(56) References Cited

U.S. PATENT DOCUMENTS

| | | | | |
|---|---|---|---|---|
| 4,733,847 | A * | 3/1988 | Grassl | B60N 2/508 297/344.16 X |
| 4,778,216 | A * | 10/1988 | Stupakis | A61G 15/002 297/DIG. 8 |
| 5,645,313 | A * | 7/1997 | Best | A61G 15/02 297/69 |
| 6,764,243 | B1 | 7/2004 | Inuzuka et al. | |
| 7,219,960 | B1 * | 5/2007 | Hajianpour | A61G 5/14 297/331 |
| 8,465,094 | B2 * | 6/2013 | Wada | B66C 13/56 297/344.1 |
| 9,139,111 | B2 * | 9/2015 | Ott | B60N 2/028 |
| 9,266,452 | B2 * | 2/2016 | Haller | B60N 2/507 |
| 10,906,432 | B2 * | 2/2021 | Haller | E02F 9/166 |
| 2006/0226685 | A1 * | 10/2006 | Priepke | B60N 2/143 297/344.24 |
| 2006/0278805 | A1 * | 12/2006 | Haller | B60N 2/525 267/136 |
| 2007/0142116 | A1 | 6/2007 | Nakamura | |
| 2010/0213345 | A1 * | 8/2010 | Haller | B60N 2/501 248/550 |
| 2010/0244512 | A1 * | 9/2010 | Dickman | B60N 2/005 296/65.01 |
| 2011/0127819 | A1 | 6/2011 | Wada | |
| 2012/0212029 | A1 * | 8/2012 | Wada | B60N 2/38 297/479 |
| 2014/0339869 | A1 | 11/2014 | Ott | |
| 2014/0354027 | A1 * | 12/2014 | Kolb | B60N 2/502 297/452.1 |
| 2015/0001901 | A1 * | 1/2015 | Lucas | B60N 2/0825 297/344.1 |
| 2015/0137567 | A1 * | 5/2015 | Smith | A61G 5/1059 297/183.1 |
| 2015/0352987 | A1 * | 12/2015 | Randleman | B60N 2/0228 297/463.1 |
| 2015/0367813 | A1 * | 12/2015 | Ballarin | B60R 22/18 280/805 |
| 2016/0355111 | A1 * | 12/2016 | Randleman | B60N 2/0228 |
| 2017/0008430 | A1 * | 1/2017 | Randleman | B60N 2/99 |
| 2020/0070693 | A1 | 3/2020 | Ryan et al. | |

FOREIGN PATENT DOCUMENTS

| | | |
|---|---|---|
| EP | 2463146 A2 | 6/2012 |
| FR | 2966545 A1 | 4/2012 |
| JP | 10184913 A | 12/1996 |

OTHER PUBLICATIONS

Grammer. Grammer Master Parts Guide. Catalog. Version 13.0, Jul. 2019. Located online at https://USA.grammer.com/fileadmin/user_upload/Grammer_Master_Parts_Guide_rev13.pdf. Especially pp. 1, 18-20, 28-31, 39-41, 46-50, 55-57, 62-64, 73-75, 83-85, 90-92, 97-101, 109-111, 116-118, 122-124, 129-130, 135-137, 141, 145, 149-151, 155-157, 162-163.

Northern Tools. Seat Accessories webpage. Dec. 28, 2020. Located online at https://www.northerntool.com/shop/tools/category_farm-acreage+seats+seat-accessories+p-250-500+p-over-500_0_0_P-Price%7C1.

European Patent Office, Extended Search Report, U.S. Appl. No. 21/209,832, filed Apr. 7, 2022, 5 pages.

* cited by examiner

BELLOWS FOR SEAT ASSEMBLY

CROSS-REFERENCE TO RELATED APPLICATIONS

Not applicable.

BACKGROUND

Seat assemblies for vehicles can include a seating portion and a base portion. In some applications, a bellows surrounds the base portion.

SUMMARY

Some aspects of the invention provide an improved bellows for a seat assembly installed within a cab of a vehicle. Embodiments of the bellows can generally include a skirt with a break in continuity to provide access to a base of the seat assembly via the break, or to install or remove the skirt from the base without detaching or removing the base portion from the cab or uninstalling the seating portion from the seat assembly.

Some aspects of the invention provide a bellows system for a seat assembly for a cab of a vehicle. The seat assembly can include a seating portion and a base portion with four sides, including a front side, first and second lateral sides, and a rear side. The bellows system can include a bellows with a skirt configured to substantially surround a perimeter of the base portion. The skirt can exhibit a continuous perimeter extending between first and second free ends of the skirt along the four sides of the base portion of the seat assembly with a break between the first and second free ends of the skirt. At least one anchor feature can be configured to releasably engage at least one opening on at least one of the bellows or the base portion to at least one of secure the first and second free ends together at the break or secure the first and second free ends to the base portion, and thereby secure the skirt around the base portion of the seat assembly. The at least one anchor feature can be releasable from the at least one opening to provide access to the base portion via the break, or to install or remove the skirt from the base portion, without detaching the base portion from the cab or detaching the seating portion from the seat assembly.

Some aspects of the invention provide a bellows assembly for a seat assembly for a cab of a vehicle. The seat assembly can include a seating portion and a base portion with four sides, including a front side, first and second lateral sides, and a rear side. The bellows assembly can include a bellows with a skirt that is sized to extend vertically to cover at least part of a height of the base portion. The skirt can exhibit a continuous perimeter between a first portion and a second portion. The skirt can be configured to extend along the four sides of the base portion of the seat assembly with a break between the first and second portions of the skirt. The bellows can also include one or more closures configured to at least one of releasably secure the first and second portions of the skirt together at the break or releasably secure the first and second portions of the skirt to the base portion, to secure the bellows to the base portion while the base portion is installed within the cab of the vehicle and while the seating portion is installed on the seat assembly.

Some aspects of the invention provide a method of installing a bellows onto a seat assembly for a cab of a vehicle. The seat assembly can include a seating portion and a base portion. The method can include separating first and second free ends of a skirt of the bellows to provide a gap between the first and second free ends. The method can also include surrounding the bellows around the base portion while the base portion remains installed within the cab of the vehicle and the seating portion remains installed on the base portion and securing the first and second free ends of the skirt together or to the base portion.

These and other features of the present disclosure will become more apparent from the following description of the illustrative embodiments.

Figure 1:
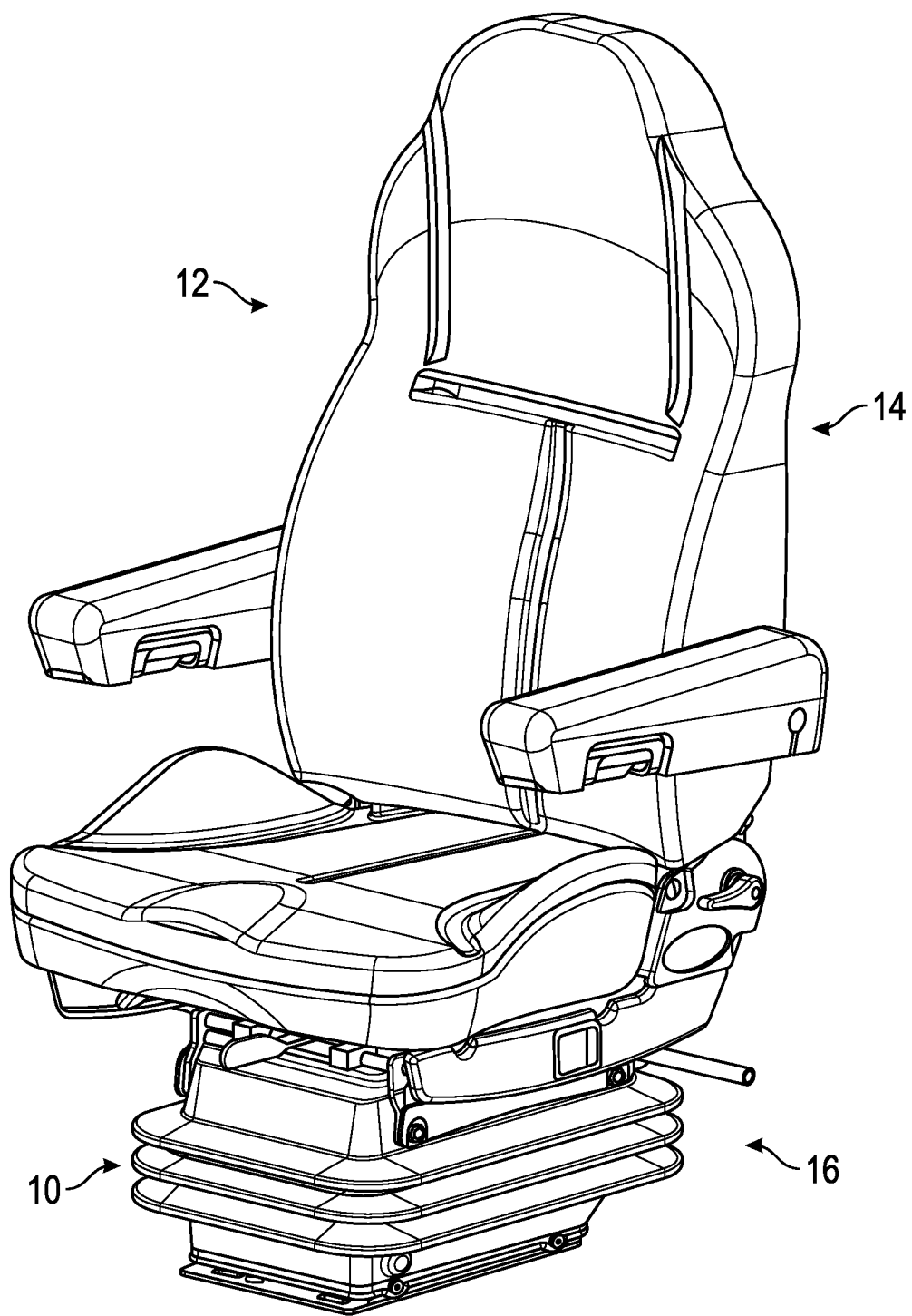
FIG. 1 is a front isometric view of a seat assembly with a bellows according to an embodiment of the invention.

Corresponding reference characters indicate corresponding parts throughout the several views. Although the drawings represent embodiments of the present disclosure, the drawings are not necessarily to scale and certain features may be exaggerated in order to better illustrate and explain the embodiments of the present disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Conventional seating assemblies can include a bellows around a base of a seat assembly. Seat bases can include, among other things, suspension systems, adjustment levers, mechanical scissor linkages, dampers, and springs. The bellows are traditionally used as a cover for aesthetics or to prevent accidental access to or ingress of objects into suspension systems or other components. These bellows are typically installed onto the base of the seat assembly prior to installation of the seat assembly in a cab of a vehicle, including as a part of a manufacturing process of the seat assembly.

For conventional designs, once the seat assembly is installed in the cab of the vehicle, gaining access to the seat base or interior of the bellows is difficult. In turn, this can make servicing, inspection, or performing maintenance on the seat base difficult as the bellows cannot be removed from the seat assembly once installed in the vehicle. To remove the bellows, either the entire seat assembly must first be removed from the vehicle so that the bellows can be pulled off from a bottom side of the base, or a seating portion of the seat assembly must be removed so that the bellows can be pulled off from a top side of the base.

As detailed below, embodiments of the invention can provide improved bellows for seat assemblies that can address the pitfalls and shortcomings described above. For example, some embodiments of the invention can provide a bellows that can be installed onto a base of a seat assembly while the seat assembly is installed in a cab of a vehicle. In this regard, in some examples, a bellows can be installed or uninstalled without removing an entire seat assembly from a cab, without removing a seating portion from a base portion of a seat assembly, or without removing a base portion from a cab. Thus, for example, installation and removal of a bellows according to some embodiments can be substantially simpler than with conventional designs. Similarly, in some examples, it may be possible to easily access internal portions of a seat assembly that are covered with a bellows during normal operation without fully removing the bellows or without removing other large components (e.g., as noted above)

To facilitate convenient installation, removal, and access within a bellows, as another example, some embodiments can include a wrap-around bellows that can include a skirt with a split or other break in continuity. The break in continuity in the skirt can enable the bellows to be wrapped around a base of the seat while the seat assembly is installed in the vehicle, without necessarily removing any substantial portion of the seat. As still another example, some embodiments can include a closure configured to couple separate portions of the skirt together relative to the break in continuity to secure the bellows around the base of the seat assembly. For example, in some cases, a closure can directly couple free ends of the skirt together. In some cases, a closure can couple free ends of the skirt together indirectly, including by coupling the free ends of the skirt to the seat assembly.

In some embodiments, these or other features can allow for the bellows to be repeatedly and removably installed/uninstalled around a base of a seat assembly without removing the seat assembly, or any substantial portion thereof, from the vehicle. This can also allow for easier access to the base of the seat when servicing or maintenance of the base is required or for a more flexible seat assembly or vehicle manufacturing process. For example, the bellows detailed herein could be installed at any point in a manufacturing process, even after a seat has been installed into a vehicle.

FIG. 1 illustrates an example of a bellows 10 installed onto a seat assembly 12 according to one embodiment of the invention. In the illustrated example, the seat assembly 12 includes a seating portion 14 and a base portion 16. The base portion 16 of the seat assembly 12 has four sides, including a front side 18, first and second lateral sides 20, 22, and a rear side 24, which in the illustrated example define a generally rectangular footprint. In other embodiments, however, a bellows can be configured according to the principles disclosed herein for use with any variety of other seat assemblies.

Figure 2:
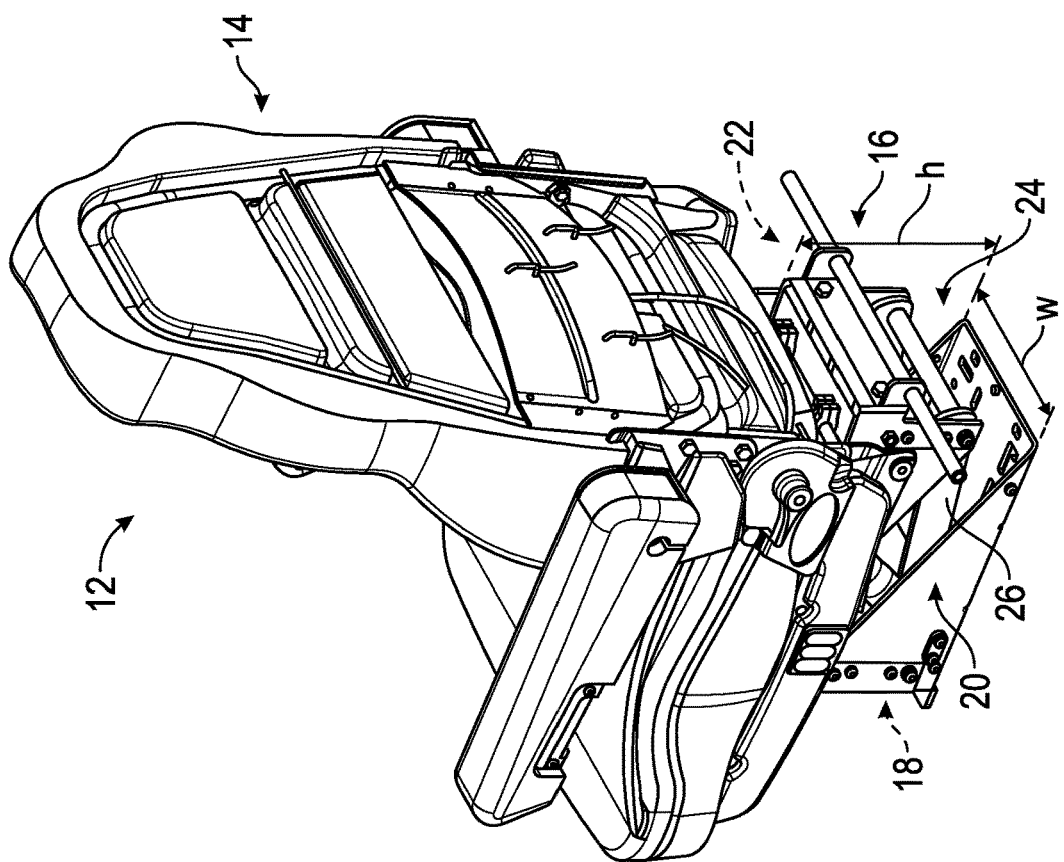
FIG. 2 is a rear isometric view of the seat assembly of FIG. 1 with the bellows removed from a base of the seat assembly.
Figure 2:
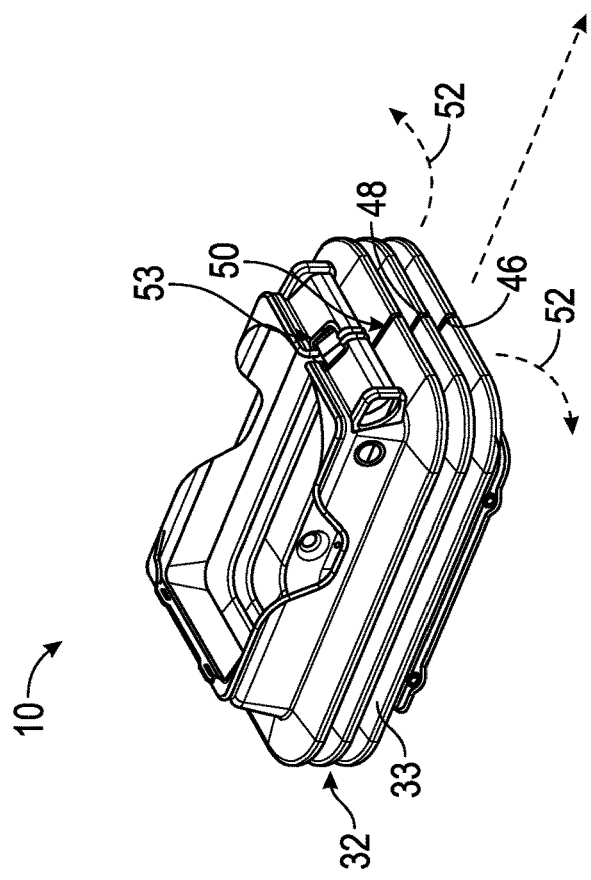

FIG. 2 illustrates the bellows 10 separated from the seat assembly 12, such as may precede installation of the bellows 10 or may follow from removal of the bellows 10 for further activity on the seat assembly 12. As generally shown in FIG. 2, the base portion 16 can include, among other things, a suspension system 26 (e.g., for height adjustment system) that can include adjustment levers, mechanical scissor linkages, dampers, springs, or other known components. The suspension system 26 can alter the overall height of the base portion 16 or allow the base portion 16 to vary in height dynamically. As generally noted above, some seat assemblies for use with bellows according to embodiments of the invention can vary from the seat assembly 12, including relative to include (or excluded) suspension systems.

Figure 3:
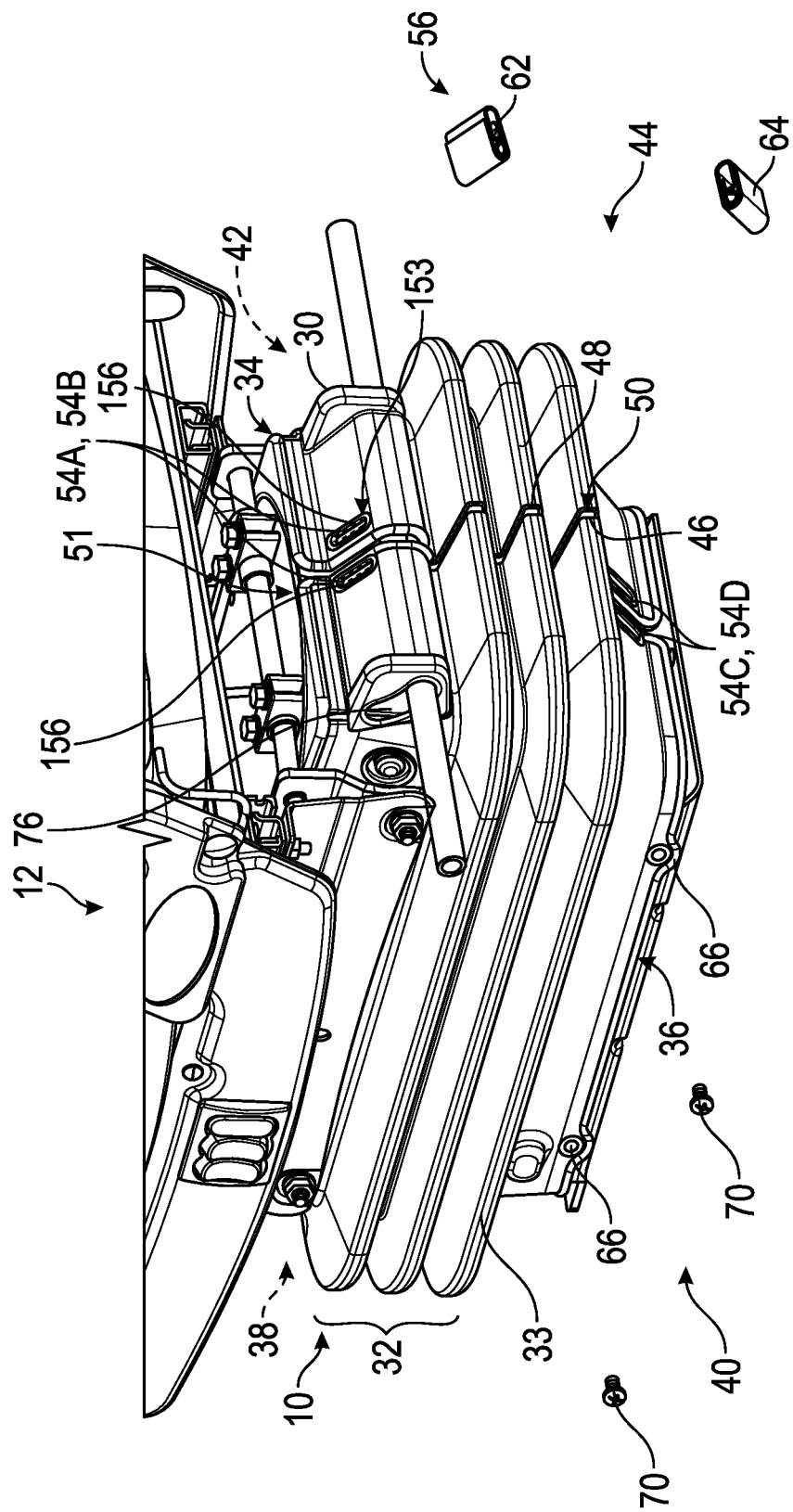
FIG. 3 is a partially exploded view of the bellows of the seat assembly of FIG. 1.

In some embodiments, a bellows can substantially surround a perimeter of a base portion, such as by extending fully along the length(s) of one or more sides of a base portion and substantially along the length(s) of the remaining sides of the base portion. Referring to FIGS. 1-3, the bellows 10 includes a skirt 30 configured to substantially surround or enclose a perimeter of the base portion 16 of the seat assembly 12. For example, as installed in FIGS. 1 and 3, the skirt 30 extends fully along at least three sides of the base portion 16 and extends substantially along at least one additional side of the base portion 16 (e.g., extends fully along the front side 18 and the first and second lateral sides 20, 22, and substantially along the rear side 24 of the base portion). As used herein, a perimeter of a base portion can be defined as the maximum, minimum, average, or footprint perimeter of the base portion at a plane parallel to a floor of a cab of a vehicle. In the illustrated embodiment, the skirt 30 can surround at least 90% of a largest perimeter of the enclosed base portion 16 at a plane parallel to a floor of the cab for an installed seat assembly. Correspondingly, "substantially surround" is used herein to describe a structure that surrounds at least 85% of a perimeter or other footprint of a reference structure. Similarly, "substantially along" or "substantially between" refers an extent of a feature that is at least 85% of a length of a corresponding other feature or a length between corresponding other features.

In some embodiments, a bellows can extend substantially along a height of a base portion. Still referring to FIGS. 1-3, the skirt 30 is configured to substantially cover a height "h" of the base portion 16 (see FIG. 2). Further, for example, the skirt 30 substantially covers a vertical height of the base portion 16 at the front side 18, the first and second lateral sides 20, 22, and the rear side 24 of the base portion 16. As used herein, the height "h" of a base portion can be defined as the vertical distance between the bottom of the base portion and the bottom of an associated seat portion, as a vertical distance between an interface between the base portion and a floor of a cab and an interface between the base portion and a seating portion, or a vertical distance between a bottom and a top of a base portion. In the illustrated embodiment, the skirt 30 can cover at least 90% of the height of the base portion 16. In some embodiments, the skirt can cover more or less than 90% of the height of the base portion (e.g., at least: 50%, 60%, 70%, 80%, etc.).

Generally, bellows as disclosed herein can be formed from a variety of materials, including a variety of appropriately durable and flexible materials. For example, the bellows 10 can be formed of a rubber or other elastomeric material and be configured to be flexible (e.g., non-rigid) at least at some locations. In some embodiments, geometry of a bellows can allow for appropriate flexibility even with relatively thick or otherwise rigid materials. For example, the bellows 10 includes an accordion portion 32 arranged between a top side 34 and a bottom side 36 of the skirt 30. The accordion portion 32 is coextensive with a perimeter of the bellows 10 as a whole, extending around a perimeter of the skirt 30, including a front side 38, first and second lateral sides 40, 42, and rear side 44 of the skirt 30.

In particular, the accordion portion 32 defines a series of stacked folds (or pleats) 33 of the skirt material that are configured to allow the skirt 30 to freely expand and contract vertically with the base portion 16 while the base portion 16 is undergoing changes in height. For example, the suspension system of height adjustment system 26 of the base portion 16 can dynamically vary in height. Similarly, the bellows 10 can vary in height along with the base portion 16 due to the accordion portion 32 of the skirt 30. In the illustrated embodiment, the accordion portion 32 includes three folds 33. In other embodiments, an accordion portion could include more or fewer than three folds depending on a required height adjustability of the bellows, the overall height "h" of the base portion, or other factors.

As also noted above, some bellows can include breaks along their perimeter, including as may accommodate relatively easy installation or removal of the bellows relative to a seat assembly. For example, the skirt 30 includes a first end portion with a first free end 46 and a second end portion with a second free end 48, relative to a perimeter of the skirt 30 that is configured to surround a seat assembly. In the illustrated embodiment, the skirt 30 exhibits a continuous perimeter extending between the first free end 46 and the second free end 48 of the skirt 30 along the four sides of the base portion 16 of the seat assembly 12 (as installed). However, the skirt 30 also includes a break 50 between the first and second free ends 46, 48 that interrupts the continuous perimeter along the break 50. In the illustrated example, the break 50 can be arranged at a rear side 44 of the skirt 30, to correspond to a rear side of a seat assembly. In other embodiments, a break 50 can be arranged on a front side, first lateral side, or second lateral side of a skirt, or elsewhere (e.g., extending along two sides, arranged at a corner between sides, and so on). Further, in the illustrated embodiment, the break 50 extends vertically fully from the top side 34 to the bottom side 36 of the skirt 30, so that the continuous perimeter of the skirt 30 is broken along the entire height of the skirt 30 and the free ends 46, 48 of the skirt 30 can be moved fully apart from each other to accommodate installation, removal, maintenance, or other operations.

In the illustrated embodiment, the first free end 46 is adjacent to the second free end 48, but spaced apart therefrom so that a gap 51 is defined between the first and second free ends 46, 48 with the bellows 10 in an installed or assembled configuration (see FIG. 3). As illustrated, the gap 51 can be preserved in some installations, with the first and second free ends 46, 48 spaced apart from each other. In other embodiments, end portions of a skirt may overlap over part or all of a height of a bellows once the bellows is installed. In such an embodiment, a gap may still exist relative to a distance between free ends of a skirt, although the end portions may overlap. In some embodiments, free ends may touch after installation, such that no gap between the free ends exists, although the skirt may still exhibit a break in continuity relative to the break in material continuity between the free ends (e.g., the skirt exhibiting a vertical split line through the skirt material).

As best illustrated in FIG. 2, the bellows 10 can be configured to be installed onto the base portion 16 of the seat assembly 12 without detaching the base portion 16 from the cab of a vehicle (e.g., while the base portion remains coupled to a floor of a vehicle or cab) or detaching the seating portion 14 from the seat assembly 12 (e.g., while the seating portion 14 remains coupled to the base portion 16). During installation of the bellows 10 onto the seat assembly 12, the first and second free ends 46, 48 of the skirt 30 can be separated at the break 50 such that deformation of the bellows 10 causes the gap 51 to be enlarged (or formed, as appropriate) between the first and second free ends 46, 48 (as illustrated by arrows 52). With sufficient separation, the gap 51 formed between the first and second free ends 46, 48 can be sufficiently large to pass along opposing sides of the seat assembly 12 and thereby to allow the bellows 10 to be installed onto the base portion 16 of the seat assembly 12. In this regard, for example, the gap 51 can be enlarged for the illustrated example to be equal to, or wider than, a width "w" of the base portion 16. In an alternative arrangement, for example, in which the break 50 is on the first or second later sides 20, 22 of the skirt 30, the gap 51 formed between the free ends of the skirt could be sufficiently enlarged to allow the bellows 10 to be installed onto the base portion 16 of the seat assembly 12 from a lateral side (e.g., lateral sides 40, 42) of the base portion 16. After the gap 51 has been enlarged to receive the base portion 16 of the seat assembly 12, the bellows 10 can then be wrapped around the base portion 16, to substantially surround the base portion 16, while the base portion 16 remains installed within the cab of the vehicle and the seating portion 14 remains installed on the base portion 16.

In some embodiments, once a bellows is installed to surround a seat assembly, closures can be engaged to secure the bellows in place. Referring now to FIGS. 2-3, for example, the bellows 10 can include one or more closures 53, 153 configured to releasably secure the first and second free ends 46, 48 of the skirt 30 together at the break 50, and/or to releasably secure the first and second free ends 46, 48 of the skirt 30 to the base portion 16, to secure the bellows 10 around the base portion 16 of the seat assembly 12. As will be described below, closures can include anchor features and anchor points, in which the anchor features and anchor points can be embodied in various forms. For example, anchor points can be configured as openings, hook and loop fasteners, buttons, or snaps, among others. In the illustrated embodiment, the one or more closures 53, 153 include a plurality of anchor points configured as openings 54 and a corresponding plurality of anchor features 56, 156. The plurality of anchor features, as will be described below, can be configured as flexible connectors or features on the base portion 16 (e.g., protrusions extending therefrom) to engage the anchor points or openings 54 (or other features) of the skirt 30. In some cases, anchor features can include only features on a base that are configured to engage openings or other features on a skirt. In some cases, anchor features can include only features that are on, or configured to only engage, a skirt. Further in this regard, for example, the embodiment illustrated in FIG. 3 may sometimes include the anchor features 56 but not the anchor features 156 (or vice versa), may include variations on the anchor features 56 that are configured to also (or alternatively) engage the base portion 16 of the seat assembly 12, or may include variations on the anchor features 156 that are configured to engage the openings 54 or other features on the skirt 30 in other ways.

Generally, the anchor features 56, 156 can be configured to collectively or individually releasably engage a corresponding set of the openings 54 to secure the skirt 30 around the seat assembly 12. In particular, the openings 54 on the skirt 30 are arranged adjacent to the first or second free ends 46, 48. Each of the anchor features 56 can be received in a corresponding set of the openings 54 to secure the first and second free ends 46, 48 of the skirt 30 together at the break 50 and thereby secure the skirt 30 around the base portion 16 of the seat assembly 12. In the illustrated embodiment, the anchor features 56 are configured as flexible connectors. Additionally or alternatively, each of the anchor features 156 (shown in dashed lines in FIG. 3) can be received in corresponding openings 54 to secure the first and second free ends 46, 48 to the base portion 16 of the seat assembly 12. In the illustrated embodiment, the anchor features 156 are configured as protrusions extending from the base portion 16, although other configurations are also possible. In some cases, anchor features formed as protrusions can be in the form of a tab, bracket, or a hook. As further described below relative to the anchor features 56, 156, some anchor features can be releasable from one or more corresponding openings to provide access to an interior area of a bellows (e.g., to a base portion of a seat assembly), or to install or remove the bellows from a seat assembly, including as generally described above (e.g., without detaching a base portion of a seat assembly from a cab of a vehicle or detaching a seating portion from a larger seat assembly).

Figure 4:
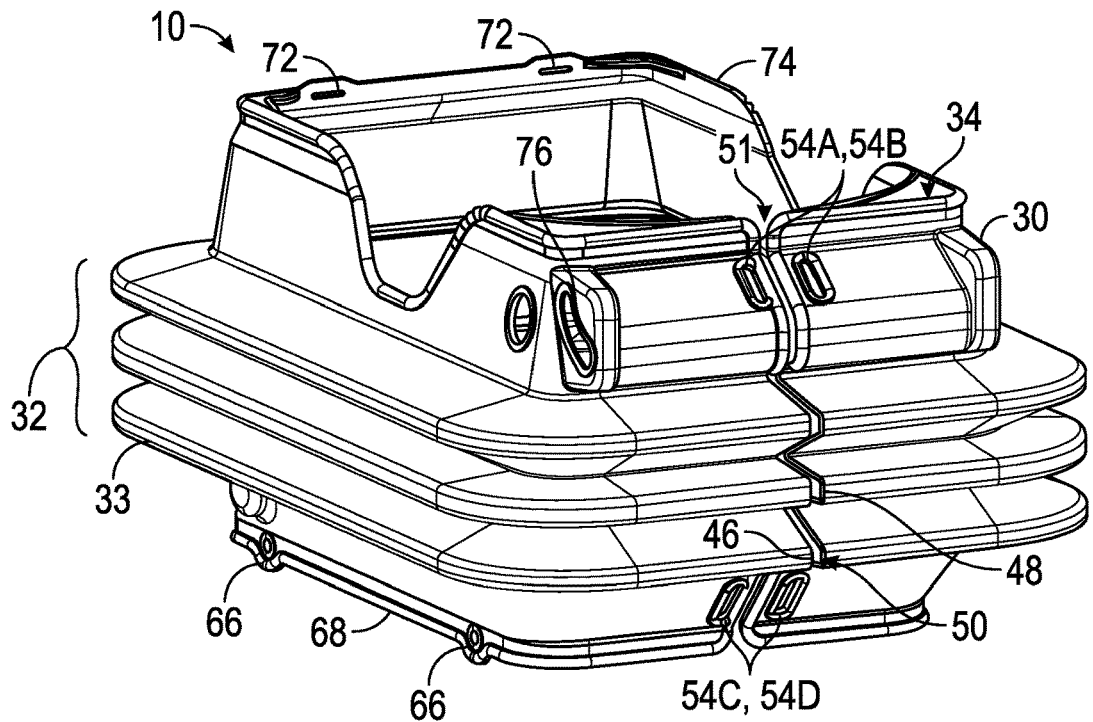
FIG. 4 is a rear isometric view of the bellows of FIG. 1.
Figure 5:
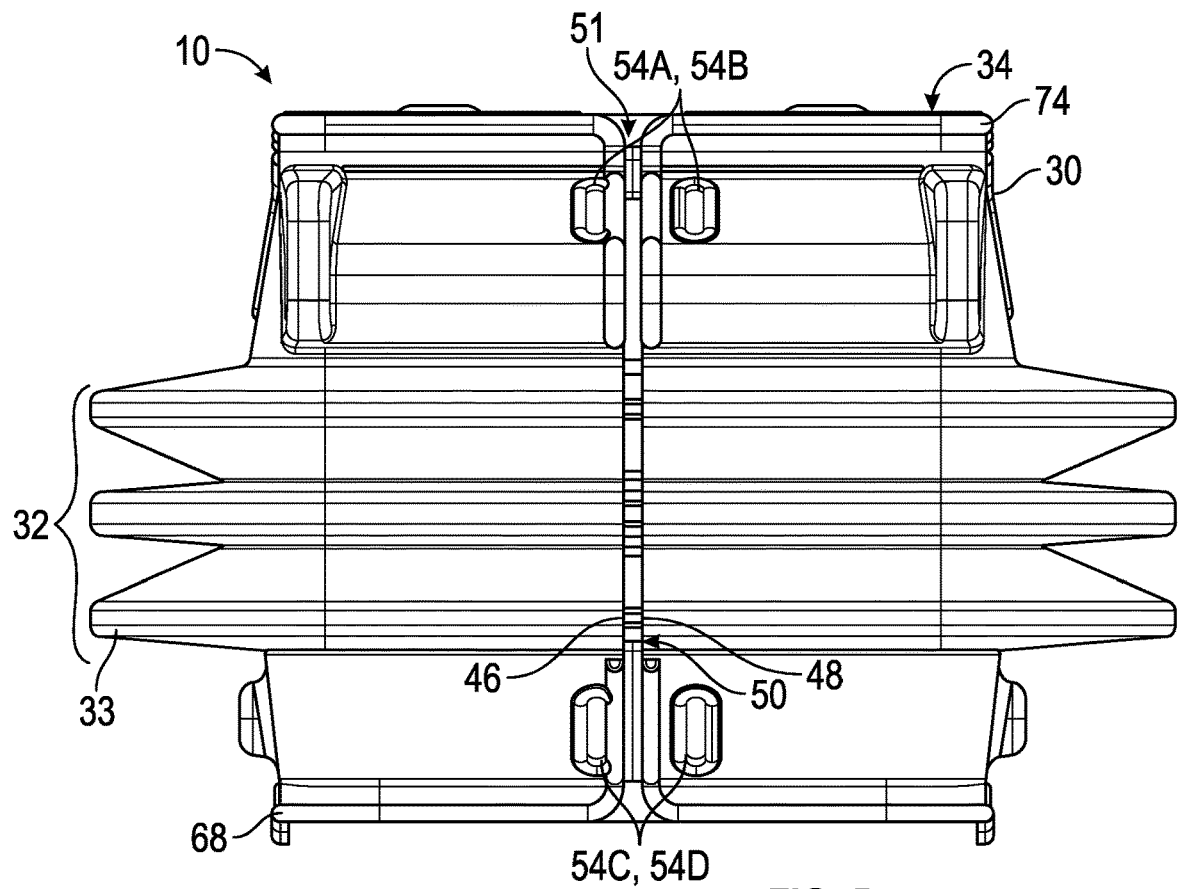
FIG. 5 is a rear elevation view of the bellows of FIG. 4.

As illustrated in FIGS. 3-5, the skirt 30 includes top openings 54A, 54B disposed above the accordion portion 32 and a bottom openings 54C, 54D disposed below the accordion portion 32. In the illustrated embodiment, the top and bottom openings 54A-54D are adjacent to the break 50. Further, the anchor feature 56 includes a first strap 62 and a second strap 64. As will be described herein, the first strap 62 can be configured to releasably engage one or more of the openings in the top openings 54A, 54B and the second strap 64 can be configured to releasably engage one or more of the openings in the bottom openings 54C, 54D to secure the first and second free ends 46, 48 together at the break 50. The first and second straps 62, 64 can include a hook and loop fastener on one or more sides of the first and second straps 62, 64, or can use other known devices (e.g., ratcheting mechanisms) to secure a strap against unwanted movement. In some embodiments, the first and second straps 62, 64 can be made of fabric, rubber, metal, or any combination thereof. In the illustrated embodiment, the anchor features 56 are in the form of straps, however other fastening features are also possible. For example, other anchor features can be in the form of a clasp or a clamp or a protrusion of various types (e.g., similar to the protrusions 156 on the base portion 16). Further, as discussed in further examples below, some straps can be integrally formed with other portions of a bellows.

In some embodiments, it may be useful to dispose closures apart from parts of a bellows that substantially deform during operation of an associated seat. For example, the location of the closures 53, including the top and bottom openings 54A-54D and the first and second straps 62, 64, being above and below the accordion portion 32 can help to ensure that the closures 53 are not overly stressed or loosened by expansion or contraction of the accordion portion 32 as the base portion 16 varies in height. The location of the closures 53 being above/below the accordion portion 32 can also locate the closures 53 near other anchor points for the bellows 10 (e.g., fastening or coupling points between the skirt 30 and the base portion 16, described in detail below), such as may facilitate easier installation or removal of the bellows 10. Further, the illustrated location may help to ensure that the closures 53 remain accessible regardless of the state of the accordion portion 32 (e.g., regardless of the current height adjustment of the seat assembly 12).

In some embodiments, one or more features can be provided to further secure a bellows relative to a seat assembly. For example, as shown in FIGS. 3 and 4 in particular, the bellows 10 includes a plurality of openings 66 below the accordion portion 32 adjacent to a bottom edge 68 of the skirt 30. In the illustrated embodiment, the first lateral side 40 includes two openings 66 and the second lateral side 42 includes two similar openings (not shown). The plurality of openings 66 can be configured to receive fasteners 70 (see FIG. 3) to secure the bottom edge 68 of the skirt 30 to the base portion 16. The bellows 10 can also include a plurality of slots 72 or other openings above the accordion portion 32 adjacent to a top edge 74 of the skirt 30. In the illustrated embodiment, the front side 38 includes two slots 72. The plurality of slots 72 can be configured to clip in or hook on to a corresponding bracket or extension of the base portion 16 to secure the top edge 74 of the skirt 30 to the base portion 16.

Continuing, the bellows 10 also includes a set of arcuate openings 76 that can be configured to movably receive extensions of the base portion 16 (see FIG. 3). The arcuate openings 76 can be arranged directly opposite each other on the first and second lateral sides 40, 42 of the skirt 30. In general, the skirt 30 can include a plurality of other features such as cutouts, bulges, and openings to allow the bellows 10 to conform to or make clearance for various protrusions, fasteners, and mechanical linkages that are coupled to, or otherwise form a part of, the base portion 16.

Figure 6:
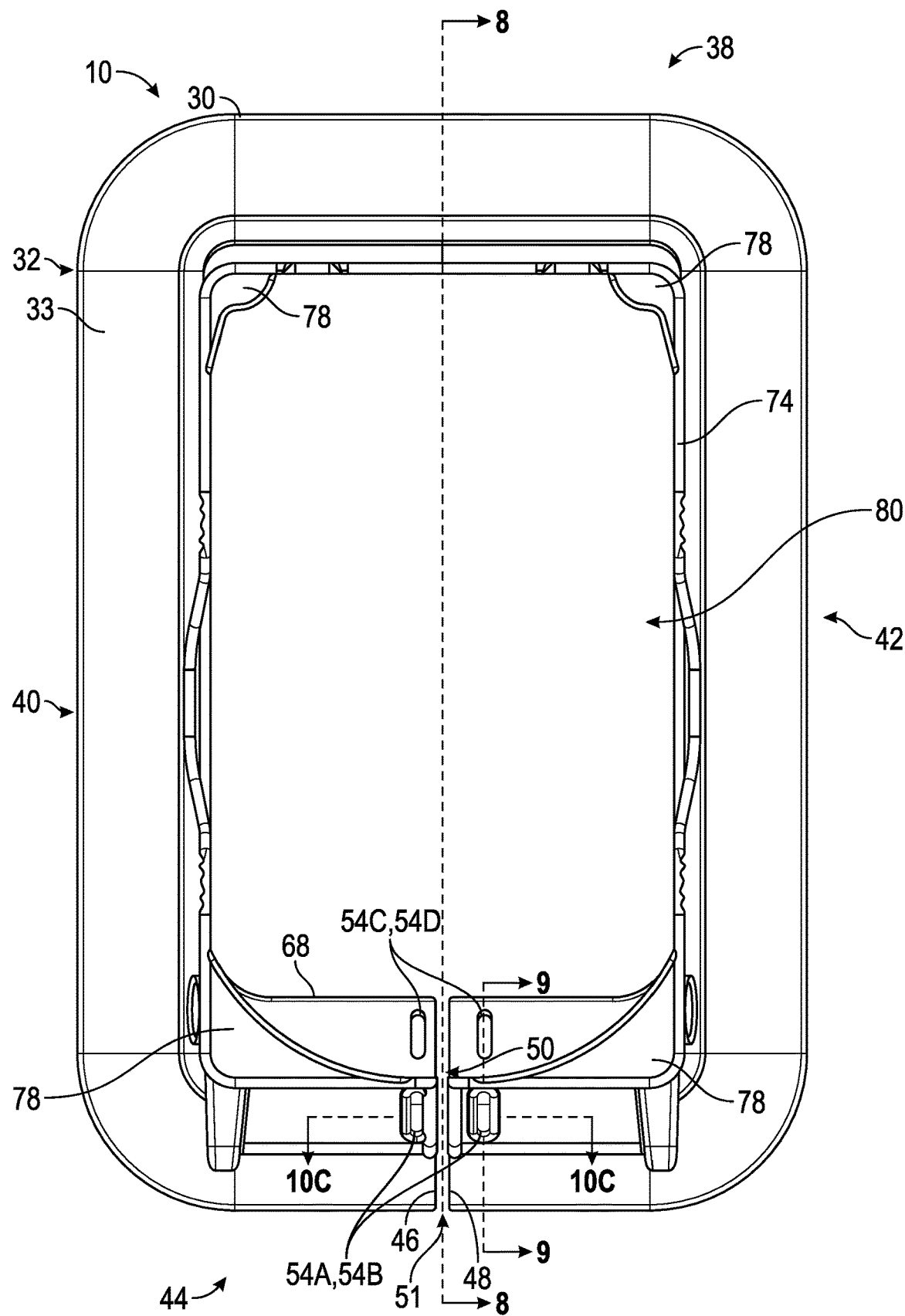
FIG. 6 is a top plan view of the bellows of FIG. 4.

Other features can also be provided in some embodiments. Referring now to FIG. 6, for example, a top side of the skirt 30 includes cap portions 78. The cap portions 78 extend inwardly towards the base portion 16, with the bellows 10 installed, such that the cap portions 78 overlap with at least a portion of the top side of the base portion 16. In some cases, for example, this can help to secure the top side of the skirt 30 to the base portion 16. In the illustrated embodiment, the top side of the skirt 30 can define an opening 80 that is substantially rectangular in shape. The rectangular shape of the opening 80 can define four corners, and the cap portions of the skirt 30 can extend inwardly from the four corners of the opening 80 to engage with the base portion. In other embodiments, however, differently configured openings are possible, including openings without cap portions or with differently configured cap portions.

Figure 7:
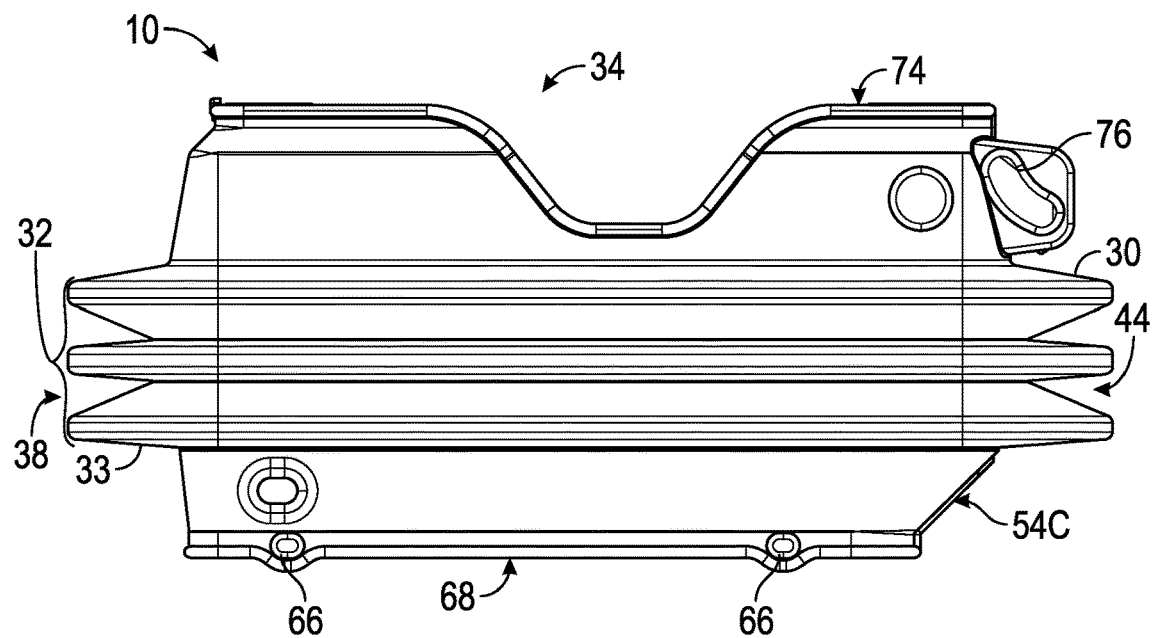
FIG. 7 is a left side elevation view of the bellows of FIG. 4.
Figure 8:
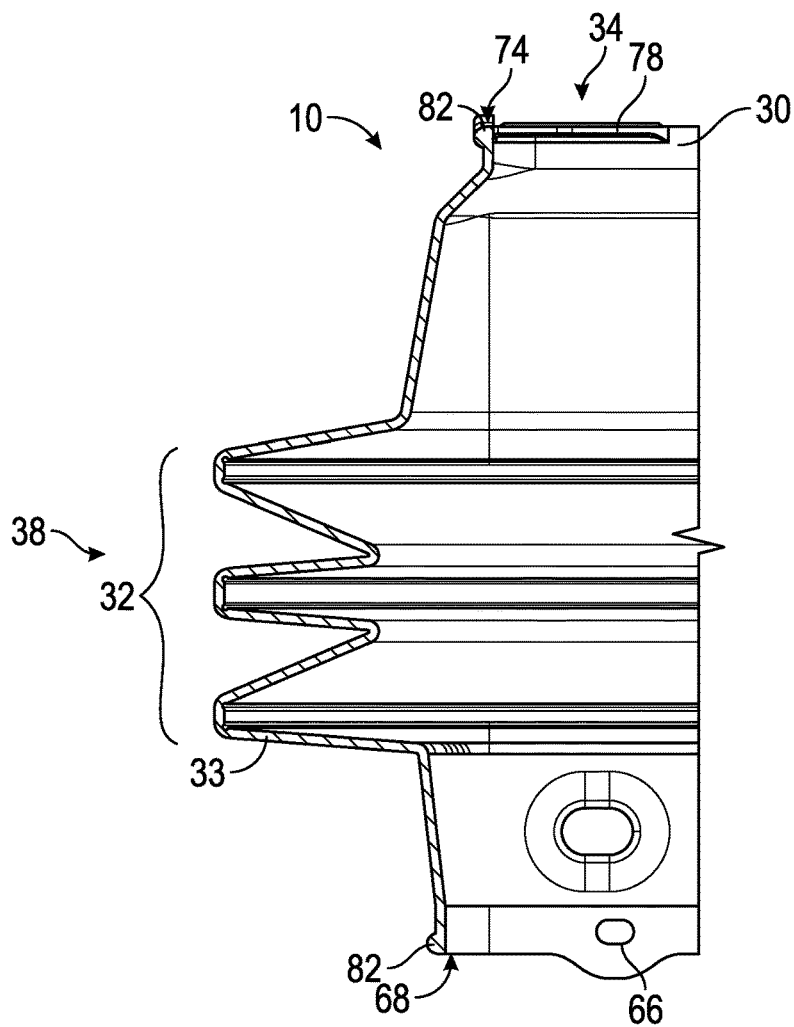
FIG. 8 is a cross-sectional view of the bellows of FIG. 1 taken along line 8-8 of FIG. 6.
Figure 9:
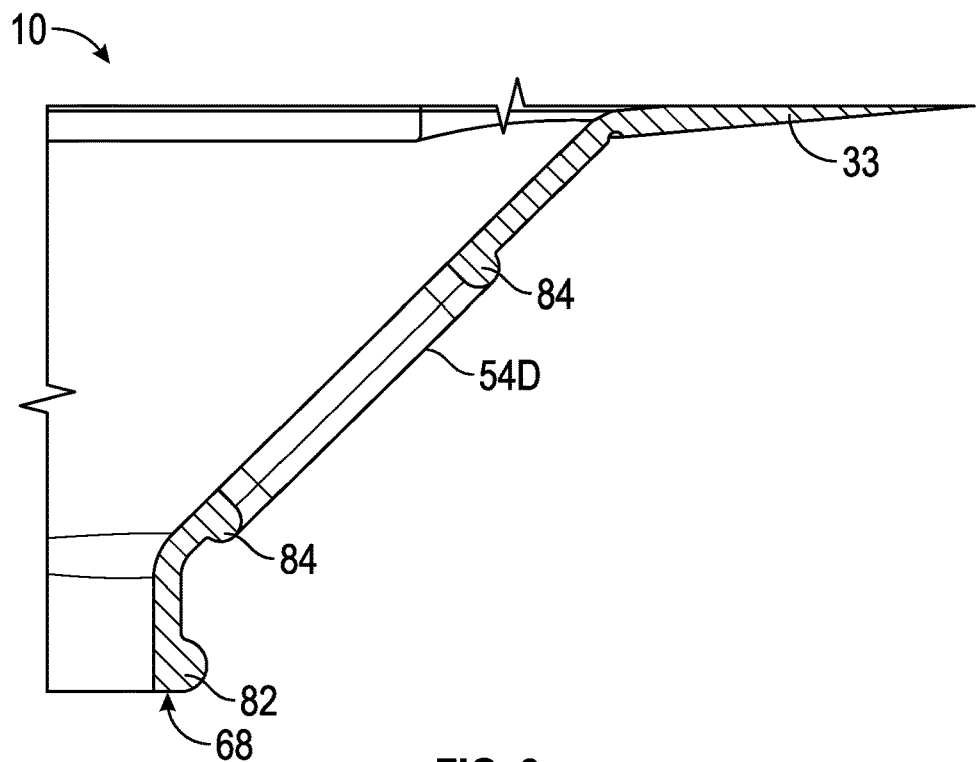
FIG. 9 is a cross-sectional partial view of the bellows of FIG. 1 taken along line 9-9 of FIG. 6.

Referring now to FIGS. 7-9, portions of the bellows 10 include a reinforcing lip, extending in some cases along a perimeter of the bellows 10 or a feature thereof. The reinforced lips along portions of the bellows 10 can be configured to add strength and durability to areas of the skirt 30. In the illustrated embodiment, at least a portion of top and bottom edges 74, 68 of the skirt 30 have a respective reinforced lip 82 that is substantially thicker than the surrounding skirt material. For example, the reinforced lip 82 can be about 10% to 200% thicker than the surrounding skirt material (e.g., a 10% to 200% increase in cross-sectional thickness, see FIG. 8). In some embodiments, the reinforced lip 82 can be about 20% to 100% thicker than the surrounding skirt material.

More particularly, in the illustrated embodiment, the reinforced lips 82 extend around the entirety top edge 74 (e.g., upper perimeter) of the skirt 30 and also around the entirety of the bottom edge 68 (e.g., lower perimeter) of the skirt 30. Further, the top and bottom reinforced lips 82 extend along a portion of the edges of the first and second free ends 46, 48 of the skirt 30 along the break 50. However, in the illustrated embodiment, the reinforced lips 82 do not extend along the folds 33 of the accordion portion 32 at the break 50. The lack of reinforcing lip at the break 50 along the accordion portion 32 can allow the accordion portion 32 to flex and bend evenly and uniformly.

Similarly to the reinforced lips 82, each of the openings 54, including the top and bottom openings 54A-54D, include a reinforced perimeter 84. The reinforced perimeter 84 can be substantially thicker than the surrounding skirt material. For example, the reinforced perimeter 84 can be about 10% to 200% thicker than the surrounding skirt material (e.g., a 10% to 200% increase in cross-sectional thickness, see FIG. 9). In some embodiments, the reinforced perimeter 84 can be about 20% to 100% thicker than the surrounding skirt material.

In the illustrated embodiment, the reinforced lips and perimeters 82, 84 are integrally formed with the skirt 30 (i.e., formed of the same material as the skirt 30). In some embodiments, the reinforced lips or perimeters 82, 84 can be in the form of a metal, plastic, or composite component (e.g., a grommet fitted into the openings 54 or onto an edge of the skirt 30). In some embodiments, the reinforced lips or perimeters 82, 84 can include materials that are over-molded or insert-molded into the bellows 10 during manufacturing. For example, a wire (not shown) could be insert molded into the bellows 10 during manufacturing such that the wire is surrounded by skirt material, thereby causing the increase in cross-sectional thickness of the skirt in the region of the reinforced lips or perimeters 82, 84. In yet further embodiments, the reinforced lips or perimeters 82, 84 can be a separate part to be inserted, fitted, or installed after molding the skirt 30.

Figure 10A:
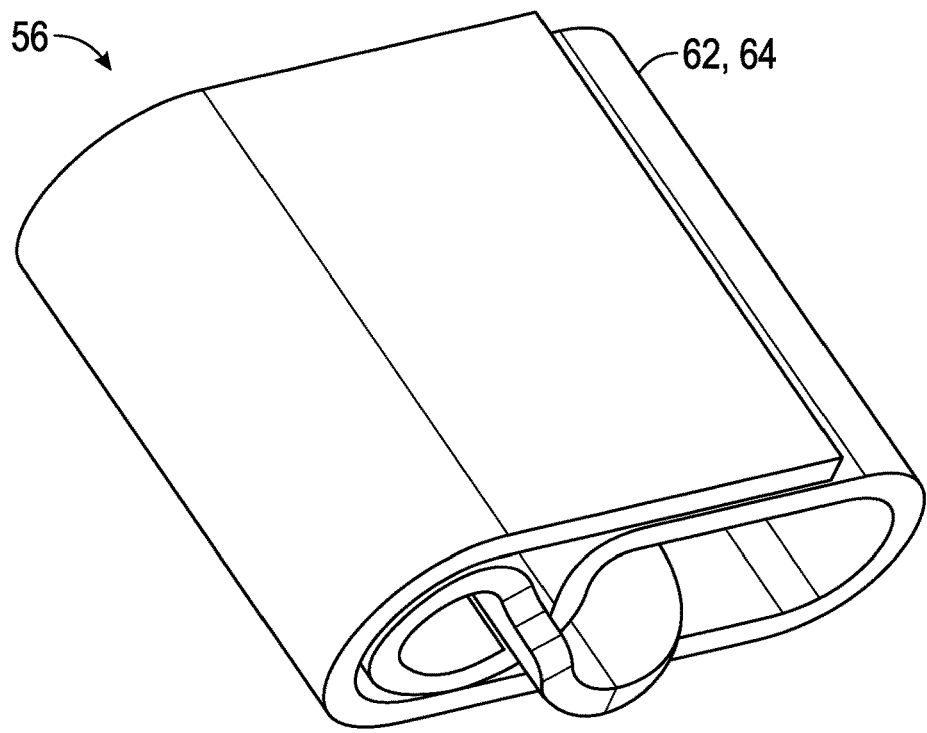
FIG. 10A is an isometric view of a closure according to one aspect of the invention.
Figure 10B:
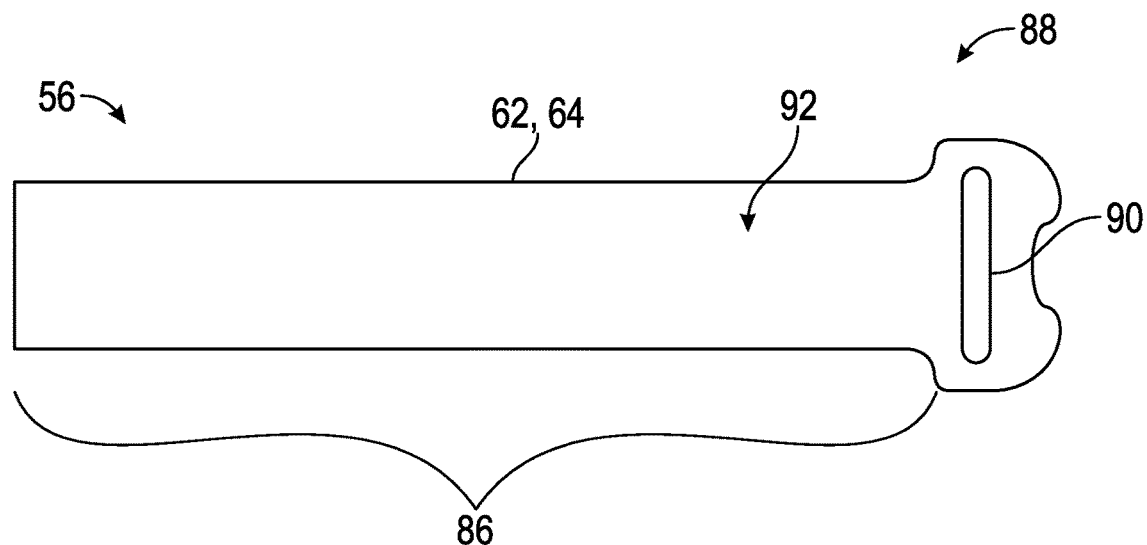
FIG. 10B is a profile view of the closure of FIG. 10A in an unfurled configuration.
Figure 10C:
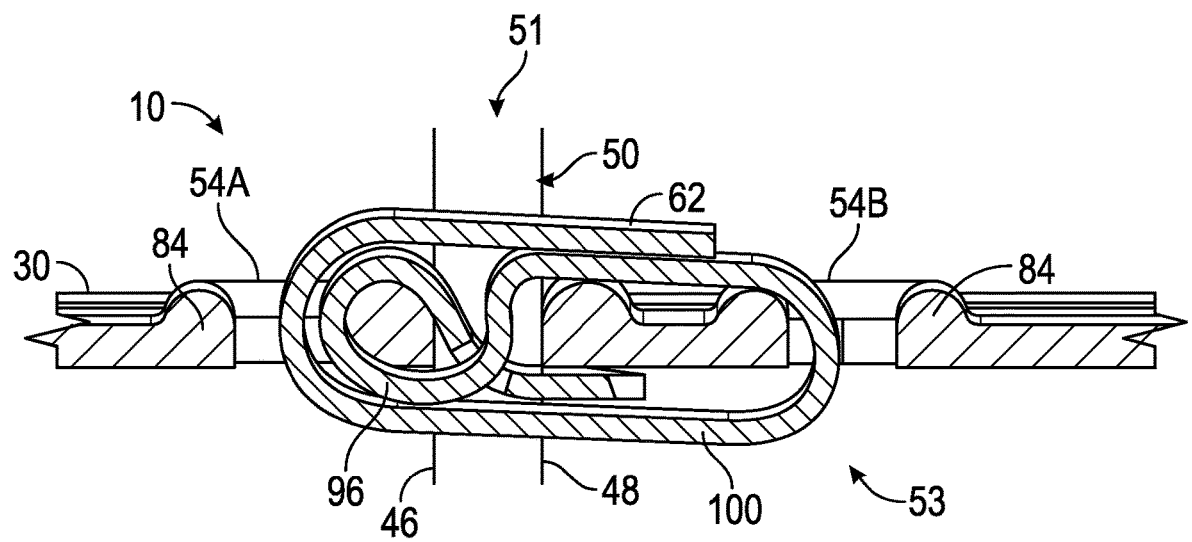
FIG. 10C is a cross-sectional view of the closure of FIG. 10A taken along line 10C-10C of FIG. 6, with the closure in an assembled configuration.

Referring now to FIGS. 10A-10C, the first and second straps 62, 64 are illustrated in an installed configuration (FIGS. 10A and 10C) and an unfurled configuration (FIG. 10B). Note that only one strap is shown for ease of illustration and the following discussion will be made with respect to the first strap 62. It is to be understood that the following discussion is also applicable to the second strap 64.

The first strap 62 includes a strap portion 86 and an eyelet portion 88 at a distal end of the strap portion 86. The eyelet portion 88 includes a slot 90 configured to receive the strap portion 86 therethrough. The first strap 62 can also include a hook and loop fastener on one or more of the surfaces of the strap (e.g., the strap portion 86 and the eyelet portion 88). For example, the first strap can be manufactured from a hook and loop fastener material such that a first side 92 of the first strap 62 can be the hook side and the second side (not shown) can be the loop side. In that way, when the first strap 62 comes into contact with itself due to an overlapping configuration, the strap can be maintained in a particular shape or orientation.

As previously noted herein, the first and second straps 62, 64 can releasably engage the top and bottom openings 54A-54D to secure the first and second free ends 46, 48 of the skirt 30 together at the break 50. As best illustrated in FIG. 10C, the first strap 62 can be inserted through opening 54A of the top openings 54A, 54B on the first free end 46 of the skirt 30. The first strap 62 can then be inserted through the slot 90 in the eyelet portion 88 to form a first loop 96. A distal end of the first strap 62 opposite the eyelet portion 88 can then be pulled to tighten the first loop 96 around the first free end 46 of the skirt 30 at the first opening 94, thereby coupling the first strap 92 to the first free end 46 of the skirt 30. The first strap 62 can then be inserted through the gap 51 and into opening 54B of the top openings 54A, 54B on the second free end 48 of the skirt 30. The first strap 62 can then be routed back towards the first opening 94, thereby forming a second loop 100. The remainder of the length of the first strap 62 can be wrapped around itself such that the first loop 96 and the second loop 100 become coupled together.

The particular arrangement of overlapping portions of a strap with itself can allow for a secure coupling of the first and second free ends of a skirt. In the specific example of a strap with a hook and loop fastener, the overlapping can increase the contact area between hook side and loop side surfaces, thereby increasing a strength of the coupling. In other embodiments, the strap could be a rubberized material that uses friction to maintain the overlapped or coiled shape of the strap. In this specific example, the overlapping can increase the total area of the strap being in contact with itself, thereby allowing for a larger area for friction to act upon. In yet further embodiments, the strap can be configured to exhibit persistent plastic deformation or can have one or more magnets and ferromagnetic materials embedded or included within the strap such that the magnets can allow the strap to be coupled with itself and remain in the overlapped configuration shown in FIG. 10C.

When access is required to the base portion 16, for example, during servicing operations, one or more of the anchor features 56, 156, as appropriate (e.g., including the first and second straps 62, 64), can allow a user or technician to gain access to the base portion 16 without detaching the base portion 16 from the cab of a vehicle (i.e., while the base portion is coupled to a floor of a vehicle or cab) or detaching the seating portion 14 from the seat assembly 12 (i.e., while the seating portion 14 is coupled to the base portion 16). This can be accomplished, in some cases, by removing the anchor features 156 from the openings 54, or by unfurling or taking the loops out of the first and second straps 62, 64, thereby decoupling the first and second free ends 46, 48 of the skirt 30, to allow the user to be able to separate the first and second free ends 46, 48 enough to conduct the servicing or to entirely remove the bellows 10 from the base portion.

FIGS. 11-14 illustrate various other embodiments of a bellows 10. Aspects of the bellows 10 illustrated in FIGS. 11-14 that are substantially similar to the embodiment illustrated in FIGS. 1-10C will be labeled with like reference numerals. It is to be understood that elements labeled with like reference numerals, unless otherwise stated in the following description or illustrated in the figures, have a similar functionality to those elements described above with respect to FIGS. 1-10C.

Figure 11:
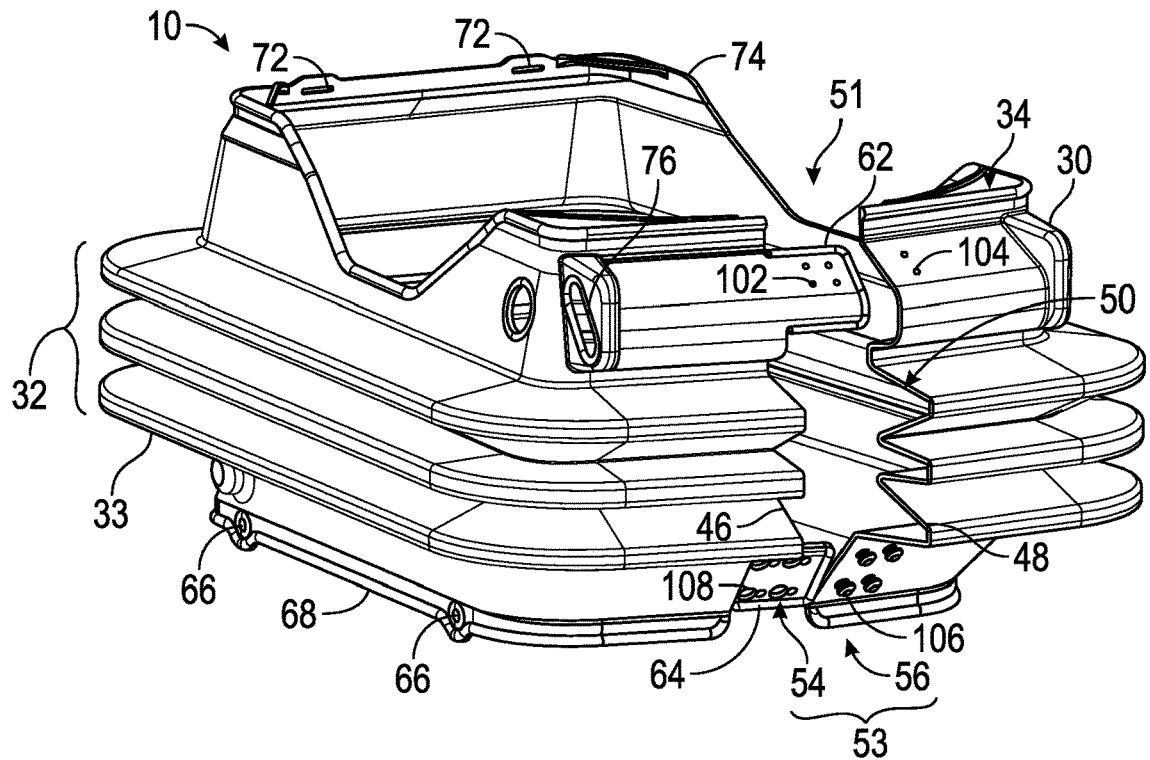
FIG. 11 is a rear isometric view of a bellows according to another embodiment of the invention.
Figure 12:
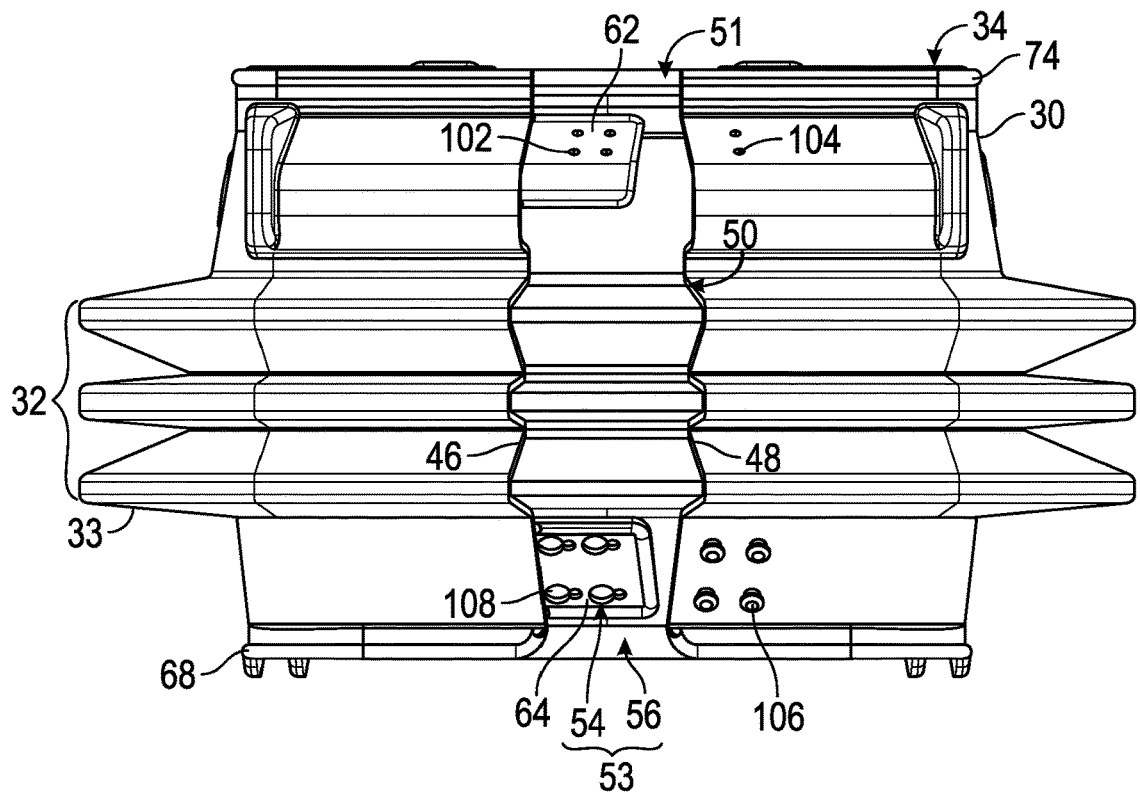
FIG. 12 is a rear elevation view of the bellows of FIG. 11.

Referring to FIGS. 11 and 12, for example, a second embodiment of a bellows 10 is illustrated. The bellows 10 includes an accordion portion 32 arranged between a top side 34 and a bottom side 36 of a skirt 30. The skirt 30 includes a first free end 46 and a second free end 48 with a break 50 therebetween. The bellows 10 can also include one or more closures 53 configured to releasably secure the first and second free ends 46, 48 of the skirt 30 together at the break 50. As illustrated, for example, the one or more closures 53 include a plurality of openings 54 arranged adjacent to the free ends 46, 48 and plurality of corresponding anchor features 56 configured as integrally formed connectors that can releasably engage the openings 54.

To help secure the bellows 10 around a seat assembly, a first strap 62 and a second strap 64 extend from the first free end 46 of the skirt 30. In the illustrated embodiment, the first and second straps 62, 64 are integrally formed with the first free end 46 and extend from the first free end 46 towards the second free end 48 at the break 50, although other configurations are possible (e.g., with one or more straps extending from each free end). Similar to the edges of the skirt 30 previously described herein, the straps 62, 64 can include a reinforcing lip.

In the illustrated example, different closures are provided to show different possible approaches to securing the bellows of FIGS. 11 and 12, although some examples may use only one of the illustrated closure types (or others). For example, the second free end 48 of the skirt 30 includes a first set of openings 104 disposed above the accordion portion 32 and the first strap 62 includes a plurality of first strap openings 102. When the bellows 10 is installed, the first set of openings 104 can be aligned with the first strap openings 102 and anchor features configured as fasteners (e.g., pins) can be received therethrough to hold the bellows 10 in place.

As another example, the second strap 64 includes a plurality of second strap openings 108 configured as keyhole openings, and one or more protrusions 106 are provided adjacent the second free end 48 of the skirt 30 below the accordion portion 32. When the bellows 10 is installed, the second strap openings 108 can receive the protrusions 106 to couple the first and second free ends 46, 48 of the skirt 30 together at the break 50.

Figure 13:
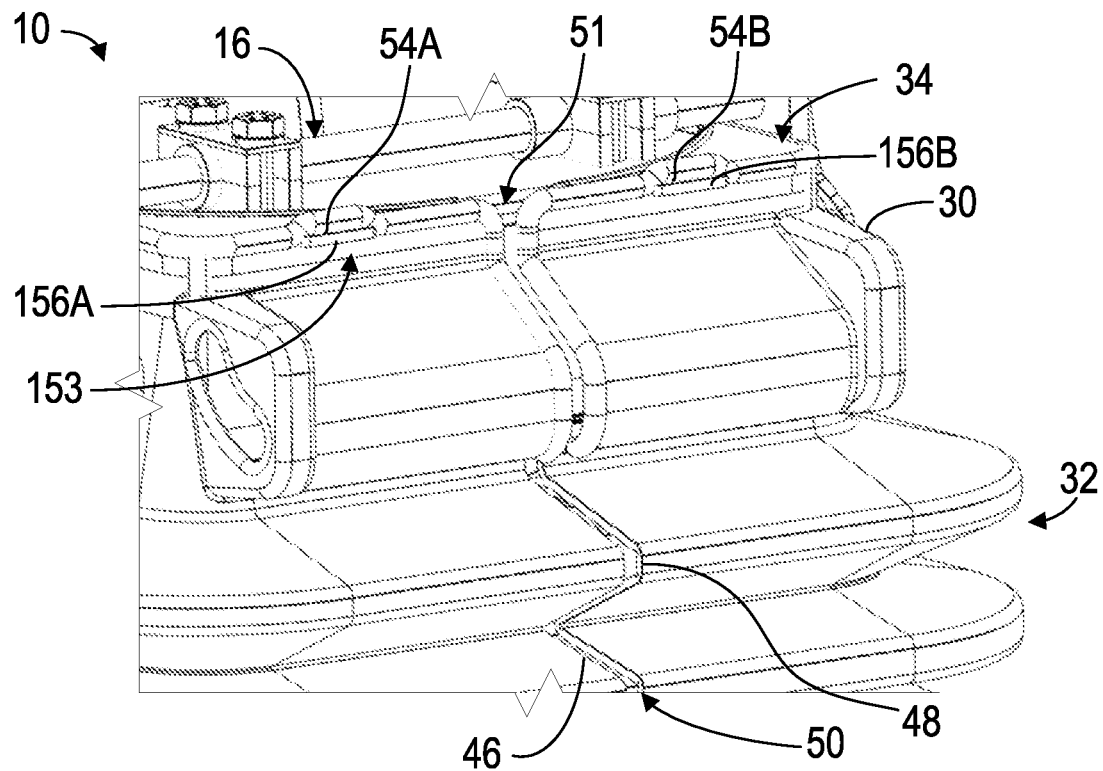
FIG. 13 is a partial rear isometric view of a bellows according to another embodiment of the invention.

Referring now to FIG. 13, a third embodiment of a bellows 10 is illustrated. In the illustrated example, another example of a closure 153 is provided. To help secure the bellows 10 around a base portion 16 of a seat assembly, anchor features 156A, 156B formed as protrusions extend from a portion of the base portion 16 of the seat assembly. When the bellows 10 is installed, the anchor features 156A, 156B can extend from the base portion 16 of the seat assembly to extend into top openings 54A, 54B of the skirt 30. In the illustrated example, the anchor features 156A, 156B are in the form of planar tabs. However, other configurations are also within the scope of this application. For example, some protrusions can include a bracket or a hook that are coupled to the base portion of a seat assembly and are configured to engage openings or other features on a skirt. In the illustrated embodiment, openings 54A, 54B are arranged near a top side 34 of the skirt 30, above the accordion portion 32, and adjacent to the break 50. Accordingly, the first and second free ends 46, 48 of the skirt 30 can be secured to the base portion 16 near the break 50. In the illustrated example, only one closure 153 is illustrated, with the two anchor features 156A, 156B on opposing sides of the break 50. However, an additional closure (e.g., similarly configured to the closure 153) may be provided below the accordion portion 32.

Figure 14:
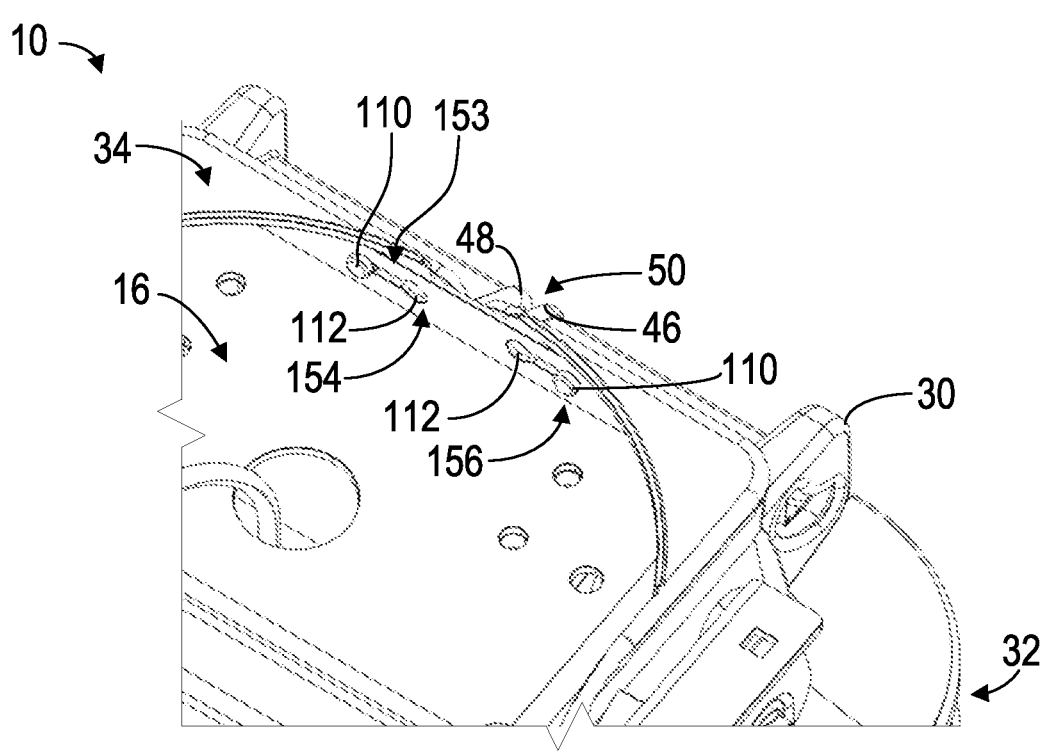
FIG. 14 is a partial front isometric view of a bellows according to yet another embodiment of the invention.

Referring now to FIG. 14, a fourth embodiment of a bellows 10 is illustrated. In the illustrated example, another example of a closure 153 is provided. To help secure the bellows 10 around a base portion 16 of a seat assembly, anchor features 156 can extend from the skirt 30 to engage openings 154 within the base portion 16 of the seat assembly. In the illustrated example, the anchor features 156 are in the form of protrusions 110 provided adjacent the first and second free ends 46, 48 of the skirt 30 above the accordion portion 32 and the openings 154 are in the form of similarly positioned keyhole openings 112, although other configurations are also possible. When the bellows 10 is installed, the openings 154 can receive the protrusions 110 to couple the first and second free ends 46, 48 of the skirt 30 to the base portion 16 of the seat assembly. In the illustrated embodiment, the openings 154 are arranged near a top side of the base portion 16 and adjacent to the break 50 within the skirt 30. In that way, the first and second free ends 46, 48 of the skirt 30 can be secured to the base portion 16 near the break 50. In the illustrated example, only one closure 153 is illustrated, however, it is to be understood that an additional closure may be provided below the accordion portion 32.

It is to be understood by those skilled in the art that the closures described herein can include anchor features and anchor points that can be embodied in various forms. For example, free ends of the skirt (or portions thereof) can include complementary features that can engage with each other to secure the free ends of the skirt to either each other or a base portion of a seat assembly. These complementary features can include snaps with complementary male and female portions that can be arranged on first and second ends of a skirt to engage with each other or with complementary male and female portions arranged on a base portion of a seat assembly. Similarly, hook and loop fasteners can be employed on ends of a skirt, integrally molded within the skirt, attached to a base portion of a seat, or otherwise arranged. In yet a further example, buttons could be used, which could engage corresponding openings. These examples are to be understood as just a few examples of closures and those skilled in the art recognize that others may fall within the scope of the present disclosure.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A bellows assembly for a seat assembly for a cab of a vehicle, the seat assembly including a seating portion and a base portion with four sides, including a front side, first and second lateral sides, and a rear side, the bellows assembly comprising:
   a bellows with a skirt that is sized to extend vertically to cover at least part of a height of the base portion, the skirt exhibiting a continuous perimeter between a first portion and a second portion, the skirt being configured to extend along the four sides of the base portion of the seat assembly with a break between the first and second portions of the skirt and a gap defined between the first and second portions of the skirt at the break; and
   one or more closures configured to at least one of releasably secure the first and second portions of the skirt together at the break or releasably secure the first and second portions of the skirt to the base portion, to secure the bellows to the base portion while the base portion is installed within the cab of the vehicle and while the seating portion is installed on the seat assembly, with the one or more closures securing the first and second portions of the skirt together at the gap or to the base portion adjacent to the gap, to secure the bellows around the base portion of the seat assembly.

2. The bellows assembly of claim 1,
   wherein the continuous perimeter extends between first and second free ends of the skirt with the break between the first and second free ends of the skirt; and
   wherein the one or more closures includes:
      at least one anchor feature configured to releasably engage at least one opening on at least one of (i) the bellows or (ii) the base portion, to either (i) secure the first and second free ends together at the break or (ii) secure the first and second free ends to the base portion, and thereby secure the skirt around the base portion of the seat assembly;
      the at least one anchor feature being releasable from the at least one opening to provide access to the base portion via the break, or to install or remove the skirt from the base portion, without detaching the base portion from the cab or detaching the seating portion from the seat assembly.

3. The bellows assembly of claim 2, wherein the skirt includes an accordion portion that is vertically expandable;
   the at least one anchor feature including a first strap and a second strap;
   the at least one opening including a first opening disposed above the accordion portion and a second opening disposed below the accordion portion; and
   the first strap being configured to be releasably engaged at the first opening and the second strap being configured to be releasably engaged at the second opening to secure the first and second free ends together at the break.

4. The bellows assembly of claim 2, the at least one anchor feature including a protrusion extending from the base portion to engage the at least one opening.

5. The bellows assembly of claim 1, wherein the first portion is adjacent to the second portion when the bellows is in an installed configuration.

6. The bellows assembly of claim 1, wherein the skirt includes an accordion portion that is vertically expandable;
   the one or more closures including a first closure and a second closure, the first closure arranged above the accordion portion and the second closure arranged below the accordion portion.

7. The bellows assembly of claim 1, wherein the one or more closures includes:
   at least one opening on at least one of (i) one or more of the first or second portions of the skirt, or (ii) the base portion of the seat assembly; and
   at least one anchor feature that engages the at least one opening to releasably secure the first and second portions of the skirt together or to the base portion.

8. The bellows assembly of claim 7, wherein the at least one opening is formed on the skirt and has a reinforced perimeter that is substantially thicker than surrounding skirt material.

9. The bellows assembly of claim 7, wherein the at least one opening is formed on the skirt and the at least one anchor feature is a strap.

10. The bellows assembly of claim 9, wherein the at least one opening includes an opening on each of the first and second portions of the skirt that is engageable by the strap.

11. The bellows assembly of claim 7, wherein the at least one opening includes a keyhole shaped profile.

12. The bellows assembly of claim 7, wherein the at least one anchor feature is integrally molded with the skirt.

13. The bellows assembly of claim 12, wherein the at least one opening is formed on the base portion of the seat assembly.

14. The bellows assembly of claim 1, wherein the bellows is configured to be secured to the base portion of the seat assembly with the break at the rear side of the base portion.

15. The bellows assembly of claim 1, wherein at least a portion of top and bottom edges of the skirt have a reinforced lip that is substantially thicker than surrounding skirt material.

16. A method of installing a bellows of a bellows assembly onto a seat assembly for a cab of a vehicle, the seat assembly including a seating portion and a base portion with four sides, including a front side, first and second lateral sides, and a rear side, the method comprising:
   separating first and second free ends of a skirt of the bellows to provide a gap between the first and second free ends, the skirt exhibiting a continuous perimeter between the first free end and the second free end;
   surrounding the bellows around the base portion while the base portion remains installed within the cab of the vehicle and the seating portion remains installed on the base portion, to extend the skirt along the four sides of the base portion of the seat assembly, with the skirt extending vertically to cover at least part of the height of the base portion, and with a break between the first and second ends of the skirt; and
   while the base portion is installed within the cab of the vehicle and the seating portion is installed on the seat assembly, securing the first and second free ends of the skirt together or to the base portion with one or more closures, to at least one of releasably secure the first and second portions of the skirt together at the break or releasably secure the first and second portions of the skirt to the base portion, to secure the bellows to the base portion.

17. The method of claim 16, further comprising inserting a strap through an opening on the first free end and an opening on the second free end to secure the first and second free ends of the skirt together.

18. The method of claim 16, further comprising inserting an anchor feature on the bellows or the base portion through an opening on the base portion or the bellows, respectively, to secure the first and second free ends of the skirt to the base portion.

19. A bellows assembly for a seat assembly for a cab of a vehicle, the seat assembly including a seating portion and a base portion with four sides, including a front side, first and second lateral sides, and a rear side, the bellows assembly comprising:
- a bellows with a skirt that is sized to extend vertically to cover at least part of a height of the base portion, the skirt exhibiting a continuous perimeter between a first portion and a second portion, the skirt being configured to extend along the four sides of the base portion of the seat assembly with a break between the first and second portions of the skirt; and
- one or more closures configured to at least one of releasably secure the first and second portions of the skirt together at the break or releasably secure the first and second portions of the skirt to the base portion, to secure the bellows to the base portion while the base portion is installed within the cab of the vehicle and while the seating portion is installed on the seat assembly;
- wherein the one or more closures includes:
  - at least one opening on at least one of (i) one or more of the first or second portions of the skirt, or (ii) the base portion of the seat assembly; and
  - at least one anchor feature that engages the at least one opening to releasably secure the first and second portions of the skirt together or to the base portion; and
- wherein the at least one opening is formed on the skirt and the at least one anchor feature is a strap.

20. A bellows assembly for a seat assembly for a cab of a vehicle, the seat assembly including a seating portion and a base portion with four sides, including a front side, first and second lateral sides, and a rear side, the bellows assembly comprising:
- a bellows with a skirt that is sized to extend vertically to cover at least part of a height of the base portion, the skirt exhibiting a continuous perimeter between a first portion and a second portion, the skirt being configured to extend along the four sides of the base portion of the seat assembly with a break between the first and second portions of the skirt; and
- one or more closures configured to at least one of releasably secure the first and second portions of the skirt together at the break or releasably secure the first and second portions of the skirt to the base portion, to secure the bellows to the base portion while the base portion is installed within the cab of the vehicle and while the seating portion is installed on the seat assembly;
- wherein the one or more closures includes:
  - at least one opening on at least one of (i) one or more of the first or second portions of the skirt, or (ii) the base portion of the seat assembly; and
  - at least one anchor feature that engages the at least one opening to releasably secure the first and second portions of the skirt together or to the base portion;
- wherein the at least one anchor feature is integrally molded with the skirt; and
- wherein the at least one opening is formed on the base portion of the seat assembly.

21. A bellows assembly for a seat assembly for a cab of a vehicle, the seat assembly including a seating portion and a base portion with four sides, including a front side, first and second lateral sides, and a rear side, the bellows assembly comprising:
- a bellows with a skirt that is sized to extend vertically to cover at least part of a height of the base portion, the skirt exhibiting a continuous perimeter between a first portion and a second portion, the skirt being configured to extend along the four sides of the base portion of the seat assembly with a break between the first and second portions of the skirt; and
- one or more closures configured to at least one of releasably secure the first and second portions of the skirt together at the break or releasably secure the first and second portions of the skirt to the base portion, to secure the bellows to the base portion while the base portion is installed within the cab of the vehicle and while the seating portion is installed on the seat assembly;
- wherein the continuous perimeter extends between first and second free ends of the skirt with the break between the first and second free ends of the skirt;
- wherein the one or more closures includes:
  - at least one anchor feature configured to releasably engage at least one opening on at least one of (i) the bellows or (ii) the base portion, to either (i) secure the first and second free ends together at the break or (ii) secure the first and second free ends to the base portion, and thereby secure the skirt around the base portion of the seat assembly;
  - the at least one anchor feature being releasable from the at least one opening to provide access to the base portion via the break, or to install or remove the skirt from the base portion, without detaching the base portion from the cab or detaching the seating portion from the seat assembly; and
  - the at least one anchor feature including a protrusion extending from the base portion to engage the at least one opening.

22. The bellows assembly of claim 21, wherein the skirt includes an accordion portion that is vertically expandable along the four sides of the base portion of the seat assembly; and
- wherein the one or more closures including a first closure and a second closure, the first closure arranged above the accordion portion and the second closure arranged below the accordion portion.

* * * * *